(12) United States Patent
Cummings

(10) Patent No.: US 6,798,170 B2
(45) Date of Patent: Sep. 28, 2004

(54) ELECTRICAL POWER SOURCE APPARATUSES, CIRCUITS, ELECTROCHEMICAL DEVICE CHARGING METHODS, AND METHODS OF CHARGING A PLURALITY OF ELECTROCHEMICAL DEVICES

(75) Inventor: John Cummings, Round Rock, TX (US)

(73) Assignee: Valence Technology, Inc., Henderson, NV (US)

( * ) Notice: Subject to any disclaimer, the term of this patent is extended or adjusted under 35 U.S.C. 154(b) by 106 days.

(21) Appl. No.: 10/071,850

(22) Filed: Feb. 8, 2002

(65) Prior Publication Data

US 2003/0151389 A1 Aug. 14, 2003

(51) Int. Cl.[7] .............................. H02H 3/20; H02H 9/04
(52) U.S. Cl. .......................... 320/122; 320/162; 361/91
(58) Field of Search .................................. 320/122, 162; 361/91, 82, 84, 56

(56) References Cited

U.S. PATENT DOCUMENTS 3,237,078 A * 2/1966 Mallory ....................... 320/122
5,821,733 A * 10/1998 Turnbull ...................... 320/116
5,982,144 A * 11/1999 Johnson et al. ............. 320/122

OTHER PUBLICATIONS

U.S. patent Serial No. 09/484,799; entitled "Lithium–based Active Materials and Preparation Thereof"; Jeremy Barker; filed Jan. 18, 2000.
"Power Pad, Electrovaya's Extended Lif Laptop Computer Battery"; http://www.fivestaradvantage.com/electrofuel/; May 13, 2002: 2 pps.

* cited by examiner

*Primary Examiner*—Bao Q. Vu
(74) *Attorney, Agent, or Firm*—James Shaurette; Michael D. Ross; Roger A. Williams

(57) ABSTRACT

Electrical power source apparatuses, circuits, electrochemical device charging methods, and methods of charging a plurality of electrochemical devices are provided. According to one aspect, an electrical power source apparatus includes a plurality of charging nodes, a plurality of electrochemical devices individually coupled with a respective one of the charging nodes and individually configured to assume an open-circuit condition in a substantially charged state and a plurality of shunting devices coupled with respective ones of the charging nodes and individually configured to shunt electrical energy from a respective one of the charging nodes after the respective electrochemical device assumes the open-circuit condition.

47 Claims, 1 Drawing Sheet

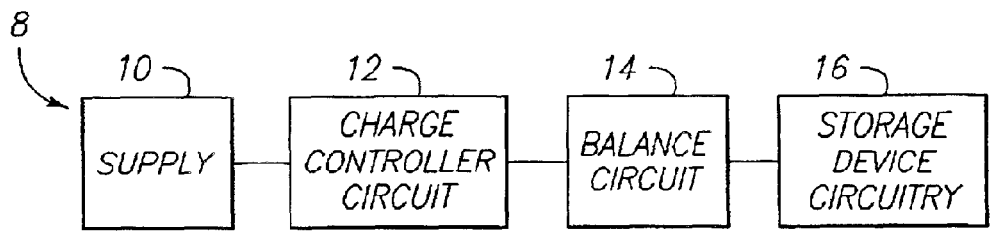
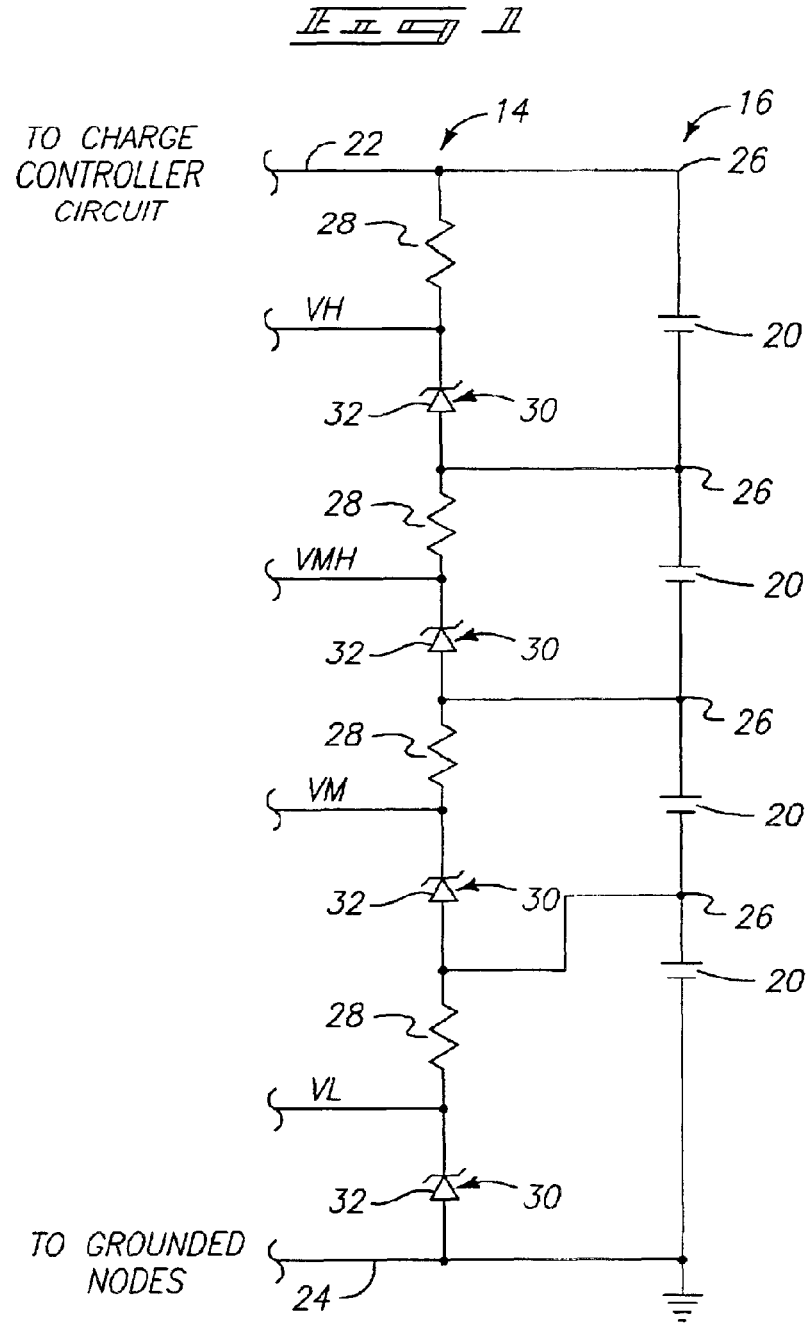

ELECTRICAL POWER SOURCE APPARATUSES, CIRCUITS, ELECTROCHEMICAL DEVICE CHARGING METHODS, AND METHODS OF CHARGING A PLURALITY OF ELECTROCHEMICAL DEVICES

TECHNICAL FIELD

This invention relates to electrical power source apparatuses, circuits, electrochemical device charging methods, and methods of charging a plurality of electrochemical devices.

BACKGROUND OF THE INVENTION

The sophistication and uses of electrical devices have increased dramatically in recent years. Consumer items having electrical components are ubiquitous in communications, computing, entertainment, etc. The size of mobile telephones, notebook computers, music players, and other devices has continued to decrease while the capabilities and quality of the devices continues to increase as modern electronic components used in such devices are developed and improved upon.

Numerous people rely upon or have grown accustomed to usage of electrical consumer devices for business, education, or for other needs. Electronic consumer devices are increasingly portable to accommodate these needs during travels from home or the workplace. The sophistication and capabilities of power supplies for such devices have also improved to meet the requirements of the electronic consumer devices. For example, cost, size, and capacity are some product characteristics which have been improved for the portable power supplies for electronic applications. There is a desire to enhance these and other design parameters of portable power supplies to accommodate increasing power requirements of the modern electronic consumer devices.

BRIEF DESCRIPTION OF THE DRAWINGS

Preferred embodiments of the invention are described below with reference to the following accompanying drawings.

FIG. 1 is a functional block diagram illustrating components of an exemplary power system according to one aspect of the present invention.

FIG. 2 is a schematic representation of exemplary configurations of a balance circuit and a plurality of electrochemical devices shown in FIG. 1.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

According to one aspect of the invention, an electrical power source apparatus comprises a plurality of charging nodes, a plurality of electrochemical devices individually coupled with a respective one of the charging nodes and individually configured to assume an open-circuit condition in a substantially charged state and a plurality of shunting devices coupled with respective ones of the charging nodes and individually configured to shunt electrical energy from a respective one of the charging nodes after the respective electrochemical device assumes the open-circuit condition.

According to a second aspect of the invention, an electrical power source apparatus comprises an electrochemical device coupled with a charging node and a ground node and a passive shunting device coupled with the charging node and the ground node in parallel with the electrochemical device and configured to shunt electrical energy from the charging node to the ground node.

According to another aspect of the invention, a circuit comprises a charging node adapted to supply electrical energy to an electrochemical device to charge the electrochemical device, wherein the electrochemical device has an end-of-charge voltage, circuitry adapted to supply electrical energy having a voltage greater than the end-of-charge voltage to the electrochemical device via the charging node after charging the electrochemical device to the end-of-charge voltage and circuitry configured to shunt electrical energy from the charging node after the supplying the electrical energy having a voltage greater than the end-of-charge voltage and after charging the electrochemical device to the end-of-charge voltage.

Another aspect of the invention provides a circuit comprising first circuitry adapted to apply electrical energy to an electrochemical device configured to operate as an open-circuit upon reaching a substantially charged state and second circuitry configured to shunt the electrical energy responsive to the electrochemical device operating as an open-circuit.

According to another aspect of the invention, an electrochemical device charging method comprises providing an electrochemical device having an end-of-charge voltage, charging the electrochemical device to the end-of-charge voltage, applying electrical energy having a voltage greater than the end-of-charge voltage to the electrochemical device after the charging the electrochemical device to the end-of-charge voltage, and shunting the electrical energy around the electrochemical device after the applying.

According to another aspect of the invention, an electrochemical device charging method comprises providing an electrochemical device coupled with a charging node, providing electrical energy to the electrochemical device using the charging node to charge the electrochemical device and the electrochemical device assuming an open-circuit condition responsive to the electrochemical device obtaining a substantially charged state, and shunting the electrical energy from the charging node after the electrochemical device assumes the open-circuit condition.

In accordance with another aspect of the invention, an electrochemical device charging method comprises providing an electrochemical device coupled with a charging node, providing electrical energy to the electrochemical device at a first moment in time using the charging node to charge the electrochemical device and passively shunting the electrical energy from the charging node at a second moment in time after the first moment in time.

According to yet another aspect of the invention, a method of charging a plurality of electrochemical devices comprises providing a plurality of a lithium cells arranged in series, the lithium cells individually having a lithium-mixed metal electrode and an end-of-charge voltage, providing a plurality of charging nodes coupled with respective ones of the lithium cells, providing a plurality of zener diodes, wherein at least one of the zener diodes is coupled with a charging node of a respective lithium cell and a charging node of a subsequent lithium cell, providing electrical energy having a voltage greater than the end-of-charge voltage to a first one of the lithium cells, charging the first lithium cell to the end-of-charge voltage using the electrical energy, applying the electrical energy having the voltage greater than the end-of-charge voltage to the first lithium cell after the charging the first lithium cell to the end-of-charge voltage and shunting the electrical energy using the at least one zener diode from the charging node of the first lithium cell to the charging node of the subsequent lithium cell after the charging and the applying.

FIG. 1 illustrates exemplary components of an exemplary power system 8 utilized to charge and/or maintain one or more electrochemical device. In the depicted exemplary power system 8, a power supply 10, a charge controller circuit 12, a balance circuit 14 and storage device circuitry 16 are provided. It is to be understood that one or more of the depicted exemplary components of FIG. 1 may be implemented within a single self-contained package, such as a battery pack. For example, in one configuration, charge controller circuit 12, balance circuit 14 and storage device circuitry 16 are implemented within a single housing (not shown), such as a battery pack housing. In another arrangement, only balance circuit 14 and storage device circuitry 16 are provided within a single package. In yet another alternative configuration, only storage device circuitry 16 is provided within a battery pack a or other housing. Other battery pack configurations are possible including other or alternative circuit components.

The components provided within a single housing containing storage device circuitry 16 are configured to removably and electrically couple with external components including supply 10, charge controller circuit 12 and\or balance circuit 14 depending upon which components are provided within the housing of the given configuration. Storage device circuitry 16 and other components within the housing are coupled with supply 10 and any other external components to implement charging operations of circuitry 16 as described herein. Such removable electrical coupling may be implemented using direct contacts or any other appropriate configurations.

During use, storage device circuitry 16 and any other components within the housing are disconnected from the supply 10 and associated components, and are thereafter connected to an appropriate load using the provided contacts or other connection. Exemplary loads include a mobile telephone, personal digital assistant (PDA), notebook computer or other electrical device.

Supply 10 may be implemented as any convenient source of electrical power, such as a utility line, generator, alternator, etc. If supply 10 is implemented as an alternating current supply, a rectifier (not shown) may be utilized to provide direct current electrical energy to charge storage device circuitry 16.

Charge controller circuit 12 is configured to monitor and control charging and/or maintenance operations of storage device circuitry 16. An exemplary charge controller circuit 12 is available from Mitsubishi Electric & Electronics U.S.A., Inc. and has product designation M37515 or M37516.

Balance circuit 14 is arranged to provide electrical charging and/or maintenance of storage device circuitry 16 coupled therewith and responsive to control of charge controller circuit 12. Further operations of an exemplary balance circuit 14 are discussed below with reference to FIG. 2.

Storage device circuitry 16 is configured to store electrical energy for use in appropriate electrical devices, such as mobile telephones, personal digital assistants (PDAs), notebook computers, or other electrical device configurations utilizing portable electrical energy. In an exemplary embodiment, storage device circuitry 16 is implemented as one or more electrochemical cell arranged to form a battery. An exemplary battery configuration of a plurality of cells arranged in series is discussed below with reference to an exemplary power source apparatus of FIG. 2.

In one embodiment of the invention, storage device circuitry 16 comprises a plurality of lithium cells individually having a lithium-mixed metal electrode. Further details regarding an exemplary lithium cell having a lithium-mixed metal electrode are discussed in U.S. patent application Ser. No. 09/484,799, entitled "Lithium-Based Active Materials and Preparation Thereof", listing Jeremy Barker as an inventor, filed Jan. 18, 2000, and incorporated herein by reference. Storage device circuitry 16 implemented as lithium cells individually having a lithium-mixed metal electrode are individually configured in at least one arrangement to provide a voltage of approximately 3.7 Volts in a substantially charged state or condition.

FIG. 2 depicts an exemplary configuration of an electrical power source apparatus comprising a balance circuit 14 and storage device circuitry 16. In the exemplary arrangement of FIG. 2, storage device circuitry 16 includes four electrochemical devices 20 coupled in series as shown. In an exemplary configuration wherein electrochemical devices 20 are implemented as lithium cells having lithium-mixed metal electrodes and providing approximately 3.7 Volts in a substantially charged state, charge controller circuit 12 supplies a charging voltage of approximately 16–20 Volts to the storage device circuitry 16 in one possible configuration (e.g., a charging voltage of 4.3 Volts/cell may be used).

Devices 20 of storage device circuitry 16 are arranged in series with one another and in parallel with balance circuit 14 in one configuration. Circuitry 14, 16 is coupled intermediate a power node 22 adapted to couple with charge controller circuit 12 and a ground connection 24 providing a reference with respect to grounded nodes of supply 10 and charge controller circuit 12.

Balance circuit 14 and electrochemical devices 20 are coupled with a plurality of respective charging nodes 26 as illustrated. Charging nodes 26 are electrically coupled with positive terminals of respective electrochemical devices 20. Negative terminals of electrochemical devices 20 are coupled with respective ground nodes. For some of the electrochemical devices 20 in the illustrated configuration, the respective ground node connected therewith is also the charging node 26 for another, subsequent, electrochemical device 20.

Charging nodes 26 are individually adapted to supply electrical energy to a respective electrochemical device 20 to charge the electrochemical device 20. Electrochemical devices 20 implemented as lithium cells as disclosed in the '799 application have an end-of-charge voltage of approximately 3.7 Volts when provided in a substantially charged state as mentioned above. Devices 20 configured as lithium cells described in the '799 application are configured to assume an open-circuit condition when provided in a substantially charged state or condition.

The depicted exemplary balance circuit 14 includes a plurality of pull-up resistors 28 and shunting devices 30. Electrochemical devices 20 are individually coupled in parallel with a respective pull-up resistor 28 and a respective shunting device 30.

In one exemplary embodiment, pull-up resistors 28 are implemented as 50 Ohm resistors. Pull-up resistors 28 serve to limit current through respective shunting devices 30 to avoid failure. Further, if devices 30 do fail (typically as a short if devices 30 are implemented as zener diodes 32), there is resistance in the associated discharge path to avoid high-current shorts. Pull-up resistors 28 operate to discharge electrical energy from the respective electrochemical device 20 and associated circuitry may be used to detect and signal such failure. Taps VH, VMH, VM, and VL may be utilized for detection and signaling.

Shunting devices 30 comprise passive shunting devices in an exemplary embodiment. In a passive configuration, devices 30 implement shunting operations without the use of control circuitry. For example, shunting devices 30 implemented as passive shunting devices may comprise breakdown devices. Exemplary breakdown devices are zener diodes 32 in but one possible configuration.

Shunting devices 30 are coupled intermediate positive and negative terminals of respective electrochemical devices 16 in the exemplary configuration of FIG. 2. Shunting devices 30 are individually configured to operate in a first operational mode wherein the device 30 impedes current flow, and a second operational mode wherein current is conducted through shunting device 30. Shunting devices 30 implemented as passive shunting devices are arranged to shunt electrical energy without the use of associated control circuitry to control operation of the shunting device in the plurality of operational modes.

Electrochemical devices 16 configured as lithium cells having lithium-mixed medal electrodes impede or inhibit flow of current providing an open-circuit once the end-of-charge voltage is reached (approximately 3.7 Volts in the described exemplary configuration). From a perspective of charge controller circuit 12, such inhibition of current flow is the equivalent of applying the maximum charge voltage to the charged electrochemical device 20 of approximately 4.3 Volts/cell in one embodiment. Balance circuit 14 operates to distribute electrical energy to other electrochemical devices 20 which are not substantially or fully charged (and accordingly not in an open-circuit condition) or to ground connection 24.

Still referring to FIG. 2, when an electrochemical device 20 reaches a charged state, an end-of charge voltage is applied to the shunting device 30 coupled with the respective charging node 26 inasmuch as the electrochemical device 20 operates as an open-circuit (less the voltage drop across the respective pull-up resistor 28). Shunting device 30, configured as a breakdown device in an exemplary embodiment, operates to shunt the electrical energy from the respective charging node 26 to ground connection 24 or another charging node 26 of an adjacent electrochemical device 20 as shown in FIG. 2 (i.e., coupled in series immediately below the electrochemical device 20 which has reached a substantially charged state). Shunting devices 30 are provided in parallel with a respective electrochemical device 20 and are configured to shunt electrical energy from a respective positive terminal of the electrochemical device 20 to a respective ground terminal of the device 20. Accordingly, individual shunting devices 30 operate to shunt electrical energy from a respective charging node 26 after the respective electrochemical device 20 assumes an open-circuit condition responsive to being substantially charged.

The exemplary configuration of shunting devices 30 implemented as passive shunting devices (e.g., breakdown devices) are individually configured corresponding to end-of-charge voltages of the respective electrochemical device 20. In one embodiment, shunting devices 30 are selected to assure that respective electrochemical devices 20 are charged to at least a substantially charged condition. For example, shunting devices 30 implemented as zener diodes 32 may be chosen to have a breakdown voltage of approximately 3.9 Volts to accommodate for any process variances of the zener diodes which may lead to a lower breakdown voltage which would preclude full charging of the respective electrochemical device 20. Additionally, selecting shunting devices 30 implemented as zener diodes with an increased breakdown voltage with respect to the end-of charge voltage accounts for a fundamental property of some zener diode configurations wherein breakdown voltage decreases as ambient temperature increases.

During charging, once the voltage of an electrochemical device 20 approaches the end-of-charge voltage of approximately 3.7 Volts, the electrochemical device 20 operates as an open-circuit resulting in the maximum charge voltage of 4.3 Volts/cell being provided at the respective charging node 26. Such exceeds the breakdown voltage of the respective zener diode 32 resulting in the charging electrical energy being passively applied to a subsequent electrochemical device 20 in the series connection or to ground.

Accordingly, electrical energy having a voltage greater than an end-of-charge voltage of an electrochemical devices 20 is applied via a respective charging node 26 to the electrochemical device 20 during charging of the device 20 and after the device 20 has been substantially charged, and such voltage increases to the maximum charging voltage until the respective shunting device 30 operates to shunt the electrical energy around the charged electrochemical device 20 to another charging node 26 or ground connection 24. In one embodiment, the shunting by an appropriate shunting device 30 is responsive to and after the respective electrochemical device 20 assumes an open-circuit condition.

In one configuration, passive shunting device 30 comprises a zener diode 32 having a breakdown voltage threshold greater than the end-of-charge voltage of the respective electrochemical device 20 to assure at least substantial charging of the device 20. In an alternative configuration, the zener diode 32 may have a breakdown voltage threshold less than the end-of-charge voltage of the respective electrochemical device 20. For example, a zener diode 32 with a breakdown voltage of approximately 3.6 Volts may be used. Such alternative configuration still typically permits the respective electrochemical device 20 to be fully or substantially charged inasmuch as the impedance of electrochemical device 20 may be less during charging than the breakdown path including zener diode 32. It is believed that utilization of zener diode 32 having a breakdown voltage threshold less than the end-of-charge voltage will not have a large impact on run-time but may potentially extend the life of the respective electrochemical device 20. Other zener diode configurations or other shunting device configurations are possible.

Once all of the electrochemical devices 20 are fully or at least substantially charged, charge controller circuit 12 may be configured to cease application of electrical energy to the charging nodes 26. Once the electrical energy is disabled or removed, the breakdown condition of the respective zener diodes 32 stays active until the voltages of the respective electrochemical devices 20 fall to the breakdown voltages, at which point, the zoner diodes 32 act like open switches to electrically isolate the positive terminals of the respective electromechanical devices 20.

The circuitry disclosed herein according to exemplary embodiments of the invention enable significant imbalances (e.g., more than 0.5 Volts difference between two electrochemical devices 20) to occur without disabling charging operations. Such is advantageous with the use of lithium cells having lithium-mixed metal electrodes. In addition, aspects of the invention provide passive circuitry having fewer components for simplistic design and cost savings when compared with conventional configurations having control circuitry.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the append claims appropriately interpreted in accordance with the doctrine of equivalents.

What is claimed is:

1. An electrical power source apparatus comprising:
    a plurality of charging nodes;
    a plurality of electrochemical devices individually coupled with a respective one of the charging nodes and individually configured to achieve an open-circuit condition in a substantially charged state; and
    a plurality of shunting devices coupled with respective ones of the charging nodes and individually configured to shunt electrical energy from a respective one of the charging nodes after the respective electrochemical device achieves the open-circuit condition.

2. The apparatus of claim 1 wherein at least one of the shunting devices is configured to shunt the electrical energy from the respective charging node to another charging node.

3. The apparatus of claim 1 wherein the shunting devices individually comprise a passive shunting device.

4. The apparatus of claim 3 wherein the shunting devices individually comprise a zener diode.

5. The apparatus of claim 1 wherein the electrochemical devices individually comprise a lithium cell having a lithium-mixed metal electrode.

6. The apparatus of claim 1 wherein the shunting devices are individually configured to electrically isolate the respective one of the charging nodes after shunting the electrical energy.

7. An electrical power source apparatus comprising:
    an electrochemical device coupled with a charging node and a ground node;
    a passive shunting device coupled with the charging node and the ground node in parallel with the electrochemical device and configured to shunt electrical energy from the charging node to the ground node; and
    wherein the passive shunting device has a breakdown voltage threshold greater than an end-of-charge voltage of the electrochemical device.

8. The apparatus of claim 7 wherein the passive shunting device is configured to operate in a first operational mode to impede current flow and in a second operational mode to shunt the electrical energy, and wherein the apparatus is devoid of control circuitry to control operation of the passive shunting device in the first operational mode and the second operational mode.

9. The apparatus of claim 7 wherein the passive shunting device comprises a breakdown device.

10. The apparatus of claim 7 wherein the passive shunting device comprises a zener diode.

11. The apparatus of claim 7 wherein the passive shunting device is configured to shunt the electrical energy to another charging node adapted to supply electrical energy to another electrochemical device coupled in series with the electrochemical device.

12. The apparatus of claim 7 wherein the electrochemical device comprises a lithium cell having a lithium-mixed metal electrode.

13. A circuit comprising:
    a charging node adapted to supply electrical energy to an electrochemical device to charge the electrochemical device, wherein the electrochemical device has an end-of-charge voltage;
    circuitry adapted to supply electrical energy having a voltage greater than the end-of-charge voltage to the electrochemical device via the charging node after charging the electrochemical device to the end-of-charge voltage; and
    circuitry configured to shunt electrical energy from the charging node after the supplying the electrical energy having the voltage greater than the end-of-charge voltage and after charging the electrochemical device to the end-of-charge voltage.

14. The circuit of claim 13 wherein the circuitry configured to shunt comprises a passive shunting device.

15. The circuit of claim 13 wherein the circuitry configured to shunt comprises circuitry with no control circuitry.

16. The circuit of claim 13 wherein the circuitry configured to shunt comprises a zener diode.

17. The circuit of claim 13 wherein the circuitry configured to shunt is configured to shunt the electrical energy to another charging node adapted to supply electrical energy to another electrochemical device coupled in series with the electrochemical device.

18. The circuit of claim 13 wherein the charging node and the circuitry are adapted to supply the electrical energy to the electrochemical device comprising a lithium cell having a lithium-mixed metal electrode.

19. A circuit comprising:
    first circuitry adapted to apply electrical energy to an electrochemical device configured to operate as an open-circuit upon reaching a substantially charged state; and
    second circuitry configured to shunt the electrical energy responsive to the electrochemical device operating as an open-circuit.

20. The circuit of claim 19 wherein the second circuitry comprises a passive shunting device.

21. The circuit of claim 19 wherein the second circuitry comprises a zener diode.

22. The circuit of claim 19 wherein the second circuitry is configured to shunt the electrical energy to another electrochemical device coupled in series with the electrochemical device.

23. The circuit of claim 19 wherein the first circuitry is adapted to apply the electrical energy to a lithium cell having a lithium-mixed metal electrode.

24. An electrochemical device charging method comprising:
    providing an electrochemical device having an end-of-charge voltage;
    charging the electrochemical device to the end-of-charge voltage;
    applying electrical energy having a voltage greater than the end-of-charge voltage to the electrochemical device after the charging the electrochemical device to the end-of-charge voltage; and
    shunting the electrical energy around the electrochemical device after the applying.

25. The method of claim 24 wherein the shunting comprises shunting using a passive shunting device.

26. The method of claim 24 wherein the shunting comprises shunting using a zener diode.

27. The method of claim 24 wherein the shunting comprises applying the electrical energy to another electrochemical device.

28. The method of claim 24 wherein the providing comprises providing the electrochemical device comprising a lithium cell having a lithium-mixed metal electrode.

29. An electrochemical device charging method comprising:
   providing an electrochemical device coupled with a charging node;
   providing electrical energy to the electrochemical device using the charging node to charge the electrochemical device, and the electrochemical device achieving an open-circuit condition responsive to the electrochemical device obtaining a substantially charged state; and
   shunting the electrical energy from the charging node after the electrochemical device achieves the open-circuit condition.

30. The method of claim 29 wherein the shunting comprises shunting using a passive shunting device.

31. The method of claim 29 wherein the shunting comprises shunting using a zener diode.

32. The method of claim 29 wherein the shunting comprises applying the electrical energy to another electrochemical device.

33. The method of claim 29 wherein the providing the electrochemical device comprises providing a lithium cell having a lithium-mixed metal electrode.

34. The method of claim 29 further comprising electrically isolating the charging node after the shunting.

35. The method of claim 29 wherein the shunting comprises shunting using a shunting device at a first moment in time, and further comprising electrically isolating the charging node at a second moment in time using the shunting device.

36. An electrochemical device charging method comprising:
   providing an electrochemical device coupled with a charging node;
   providing electrical energy to the electrochemical device at a first moment in time using the charging node to charge the electrochemical device;
   passively shunting the electrical energy from the charging node at a second moment in time after the fist moment in time; and
   wherein the providing comprises providing the electrochemical device comprising a lithium cell having a lithium-mixed metal electrode.

37. The method of claim 36 wherein the passively shunting comprises passively shunting without using control circuitry to control the shunting.

38. The method of claim 36 wherein the passively shunting comprises passively shunting using a zener diode.

39. The method of claim 36 wherein the passively shunting comprises passively shunting using a breakdown device.

40. The method of claim 36 wherein the shunting comprises applying the electrical energy to another electrochemical device.

41. A method of charging a plurality of electrochemical devices comprising:
   providing a plurality of a lithium cells arranged in series, the lithium cells individually having a lithium-mixed metal electrode and an end-of-charge voltage;
   providing a plurality of charging nodes coupled with respective ones of the lithium cells;
   providing a plurality of zener diodes, wherein at least one of the zoner diodes is coupled with a charging node of a respective lithium cell and a charging node of a subsequent lithium cell;
   providing electrical energy having a voltage greater than the end-of-charge voltage to a first one of the lithium cells;
   charging the first lithium cell to the end-of-charge voltage using the electrical energy;
   applying the electrical energy having the voltage greater than the end-of-charge voltage to the first lithium cell after the charging the first lithium cell to the end-of-charge voltage; and
   shunting the electrical energy using the at least one zener diode from the charging node of the first lithium call to the charging node of the subsequent lithium cell after the charging and the applying.

42. The apparatus of claim 1 wherein electrical energy having a voltage greater than an end-of-charge voltage of individual ones of the electrochemical devices is applied to individual ones of the electrochemical devices after the respective ones of the electrochemical devices reach the substantially charged state and prior to the shunting of the respective electrical energy.

43. The apparatus of claim 7 wherein the passive shunting device is configured to operate in selected ones of an open-circuit operational mode and a closed-circuit operational mode responsive to a voltage differential across plural power terminals of the passive shunting device and without an external signal.

44. The circuit of claim 19 wherein the electrical energy comprises electrical energy having a voltage greater than a end-of-charge voltage of the electrochemical device and wherein the first circuitry is configured to apply the electrical energy to the electrochemical device in the substantially charged state and prior to shunting of the electrical energy by the second circuitry.

45. The circuit of claim 19 wherein the second circuitry comprises a passive switching device configured to change from an open-circuit operational mode to a closed-circuit operational mode wherein the electrical energy is shunted responsive to a voltage differential across plural power terminals of the passive shunting device and in the absence of an external signal.

46. The method of claim 36 wherein the passively shunting comprises passively shunting using a passive shunting device and responsive to a voltage differential across plural power terminals of the passive shunting device and in the absence of an external signal.

47. The method of claim 36 further comprising providing electrical energy having a voltage greater than an end-of-charge voltage of the electrochemical device to the electrochemical device at an intermediate moment in time after the electrochemical device has reached a substantially charged state and prior to the second moment in time.

* * * * *